United States Patent [19]

Schappach

[11] Patent Number: 4,765,253
[45] Date of Patent: Aug. 23, 1988

[54] MODULAR FURNITURE ASSEMBLY

[76] Inventor: Richard Schappach, 1727 Amazon Rd., Mohegan Lake, N.Y. 10547

[21] Appl. No.: 778,860

[22] Filed: Sep. 23, 1985

[51] Int. Cl.$^4$ .............................................. A47B 3/06
[52] U.S. Cl. ................................ 108/153; 108/111; 403/252
[58] Field of Search ............... 108/153, 111, 155, 156, 108/157, 101; 248/916, 188, 188.91; 403/381, 252, 254, 353, 348; 211/192; 297/157

[56] References Cited

U.S. PATENT DOCUMENTS

| | | | |
|---|---|---|---|
| 567,676 | 9/1896 | Bohy | 403/252 |
| 795,957 | 8/1905 | Cartland | 108/157 X |
| 1,623,317 | 4/1927 | Le Tourneau | 403/252 |
| 1,675,827 | 7/1928 | Schrader | 108/156 |
| 2,366,676 | 1/1945 | Rosenthal | 108/111 |
| 2,560,957 | 7/1951 | Johnson | 108/111 |
| 3,697,034 | 10/1972 | Shell | 211/192 X |
| 3,912,210 | 10/1975 | von Bohr | 108/156 X |
| 3,986,780 | 10/1976 | Nivet | 403/353 |
| 4,444,125 | 4/1984 | Welsch et al. | 108/153 X |
| 4,515,280 | 5/1985 | Sheu | 108/111 X |

FOREIGN PATENT DOCUMENTS

| | | | |
|---|---|---|---|
| 162667 | 3/1949 | Austria | 108/153 |
| 853091 | 10/1970 | Canada | 108/155 |

Primary Examiner—Francis K. Zugel
Assistant Examiner—José V. Chen
Attorney, Agent, or Firm—John F. Ohlandt

[57] ABSTRACT

A modular furniture assembly includes a top member having a plurality of keyways disposed therein. A plurality of legs are provided to support the top member. Each of the legs includes at least one key bolt member sized and shaped for sliding engagement within one of the keyways to attach the leg to the top member. Stabilizing rails are disposed opposite each other and interconnect paired members of the legs to provide support and stability to the legs. The rails are keyed to interlock with notched portions disposed in the legs. Finally, a cross member interconnects the oppositely disposed stabilizing rails to provide fixed support for the legs. The end portions of the cross member are keyed to interlock with the stabilizing rails.

6 Claims, 6 Drawing Sheets

MODULAR FURNITURE ASSEMBLY

BACKGROUND OF THE INVENTION

1. Field of the Invention

The present invention relates generally to furniture construction and, more particularly, to modular furniture assemblies. Specifically, the present invention relates to an improved modular furniture assembly providing greater support and stability and adapted to incorporate a wide variety of top components.

2. Description of the Prior Art

The art of furniture design and construction has evolved rather rapidly over the last half century. With the advent of metal nails, modern glues and assembly line techniques, furniture construction has changed dramatically. Tables, book shelves, chairs and the like constructed from machine-made components have resulted in sturdy, permanently constructed furniture, albeit rather utilitarian in design at times.

A recent furniture trend in our mobile, modern society has been to the modular furniture requiring no permanently affixed portions using glue, nails or the like. Such modular furniture seems to suit the mobility factor of certain segments of our society due to the fact that such furniture can be easily disassembled for storage and/or compact moving and then readily reassembled in a new residence. Such modular furniture, while easily assembled and disassembled, has certain drawbacks. First, the furniture is not permanent since it is specifically designed to be readily disassembled. This non-permanence factor generally results in the furniture, particularly tables, and the like, being rather unsteady and relatively weak in support when compared to their non-modular, permanently constructed counterparts. This becomes particularly true once the furniture has been disassembled and reassembled a number of times. Second, the modular furniture construction provided heretofore has generally been rather plain in design and appearance and incapable of providing a variety of choices such as in table top designs, material selections and the like.

SUMMARY OF THE INVENTION

Therefore, it is one object of the present invention to provide an improved modular furniture assembly.

It is another object of the present invention to provide a modular table assembly having improved stability and support capability.

It is yet another object of the present invention to provide a modular furniture assembly having the capability of receiving a variety of differing design inlay components so as to provide varied table top design characteristics with the same basic table assembly.

It is a further object of the present invention to provide a table assembly which is readily assembled without nails, glue or the like into a permanent-like structure.

To achieve the foregoing and other objects and in accordance with the purpose of the present invention, a modular furniture assembly is provided. The furniture assembly includes a top member having a plurality of keyways disposed therein. A plurality of legs are provided to support the top member. Each leg includes at least one key bolt member sized and shaped for sliding engagement within one of the keyways to attach the leg to the top member. Stabilizing rails are disposed opposite each other and interconnect paired members of the legs to provide support and stability to the legs. The rails are keyed to interlock with notched portions disposed in the legs. Finally, a cross member interconnects the oppositely disposed stabilizing rails to provide fixed support for the legs. The end portions of the cross member are keyed to interlock with the stabilizing rails.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings in which:

DETAILED DESCRIPTION OF THE PREFERRED EMBODIMENTS

Figure 1:
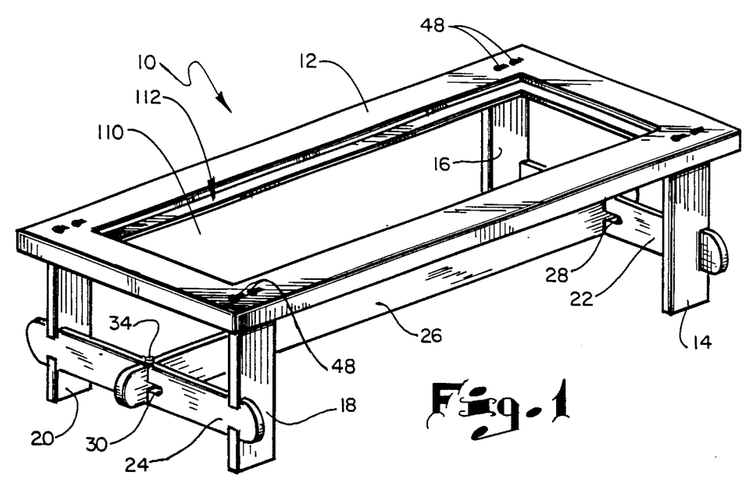
FIG. 1 is a perspective view of a modular table assembly constructed in accordance with the present invention.
Figure 4:
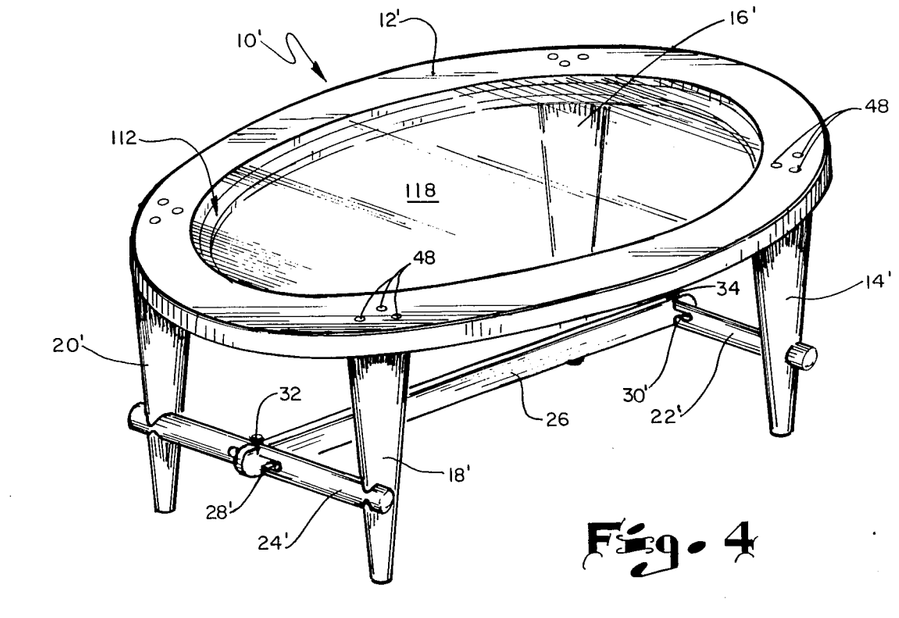
FIG. 4 is a perspective view of yet another table assembly embodiment constructed in accordance with the present invention.
Figure 5:
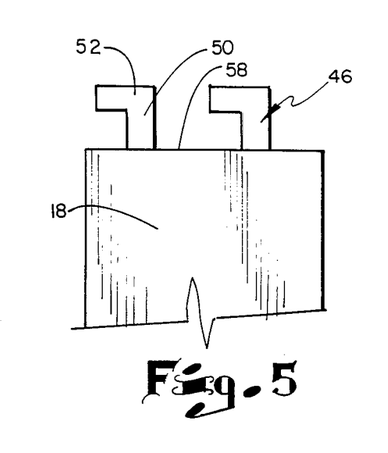
FIG. 5 is a side sectional view of the upper portion of one leg member of the present invention and particularly illustrating the key bolts extending therefrom.

Referring now to the figures, and more particularly to FIGS. 1 and 4, a modular table assembly 10 is illustrated. The table assembly 10 may be constructed from any desired type of material such as plastic, wood, metallics, and the like, but is preferably made from wood. The assembly 10 includes a table top member 12 and a plurality of leg members 14, 16, 18 and 20 adapted to support the table top 12. The table top member 12 may be made in any desried shape such as rectangular (FIG. 1), oval (FIG. 4), square, round or the like. The shape of the legs 14–20 may likewise be varied (see FIGS. 1 and 4). A plurality of oppositely disposed stabilizing rails 22, 24 are provided for interconnecting and bracing paired members of the legs. In preferred form, one stabilizing rail 22 interconnects one pair of legs 14, 16, while a second stabilizing rail 24 interconnects a second pair of legs 18, 20.

A cross member 26 interconnects the stabilizing rails 22 and 24 to provide fixed support for the legs 14, 16, 18 and 20. Without this cross member 26, the stabilizing rails 22, 24 would be insufficient to provide firm, permanent-like support for the legs and table top member. The means for attaching the cross member 26 will be discussed in greater detail below. However, it should be noted that elongated slots 28, 30 are provided in the central positions of the rails 22, 24, respectively, and pin members 32, 34 assist in securing the cross member 26 to the rails 22, 24 within the slots 28, 30.

Referring to FIG. 4, an oval table assembly 10' is illustrated. Rounded legs 14', 16', 18' and 20' are interconnected to oval table top 12'. Stabilizing rails 22', 24' are interlocked with the legs 14'–20' similar to the embodiment of FIG. 1. Finally, a cross member 26 interconnects the rails 22' and 24' through use of the slots 28', 30' and the pin members 32', 34'.

Referring now to FIGS. 1, 2, 3, 11 and 12, each stabilizing rail, for example rail 24, includes an end portion 36 at each end thereof. In one form of the embodiment, the end portion 36 is rounded. However, any desired type of design for decorative and aesthetic purposes may be utilized, as illustrated in FIG. 4 for example. The end portion 36 is formed and defined by a pair of opposing notches 38, 40 disposed in the side edges 39, 41 of the rail 24. The notches 38, 40 are sized and shaped to form a narrowed neck portion 42 which links the end portion 36 with the main body of the rail 24.

Each leg member, for example leg 18, includes a notched portion 44 disposed in the side edge 45 thereof. The notched portion 44 is sized and shaped so as to snugly receive the neck portion 42 of the rail 24 so as to press fit the rail 24 to the leg 18 with the end portion 36 projecting outwardly from the leg 18 as illustrated particularly in FIG. 12. The size and shape of the neck portion 42 will depend upon and be adjusted according to the dimensions of the leg to which the rail 24 is to be secured as well as the notched portion 44 therein. While it is not specifically illustrated, the leg 18 can have a substantially square cross-section. In this instance, the neck portion 42 of the rail 24 is substantially elongated as compared to the neck portion 42 illustrated in FIG. 11. It should also be noted while the notched portions 44 in each of the legs 18–20 may be positioned anywhere along the length of the legs, it is preferred that the notched portion 44 be positioned at least half way down the legs so as to maximize the space between the notched portions 44 and the table top 12. This will increase the stability provided by the rails 22, 24 and the like.

Referring now to FIGS. 1, 2, and 3–10, and using leg 18 by way of example, each leg includes at least one and preferably at least a pair of key bolts 46 which are adapted for engagement within corresponding keyways 48 disposed in the table top 12. In the preferred embodiment of the present invention, each key bolt includes a central shaft 50 and a tab portion 52 extending radially outwardly from the shaft 50. Each of the keyways includes a central aperture 54 which is sized and shaped to be able to receive the entire key bolt 46. Thus, the diameter of the central aperture 54 is substantially greater than the diameter of the shaft 50. The keyway further includes a shelf portion 56 extending radially outwardly from the central aperture 54 which forms a ledge 64. The shelf portion 56 is sized and shaped so as to snugly receive the tab 52 of the key bolt 46 when the key bolt 46 is inserted appropriately within the keyway 48.

Figure 6:
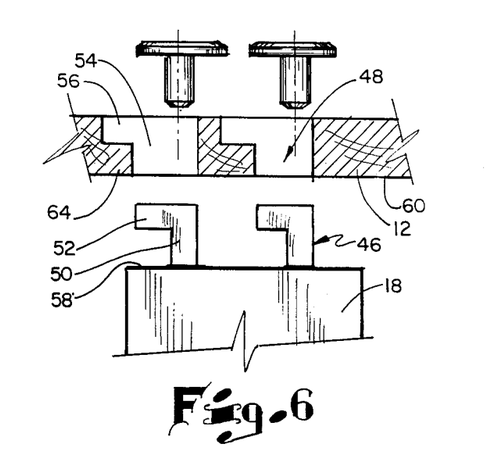
FIG. 6 is a side perspective view, with some parts in section, of the leg assembly of FIG. 5 positioned beneath a table top member prior to engagement therewith.
Figure 7:
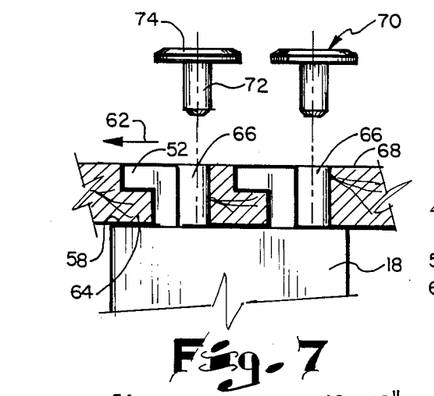
FIG. 7 is a view similar to FIG. 6 except that the key bolts have been fully engaged within the keyways of the table top member.
Figure 8:
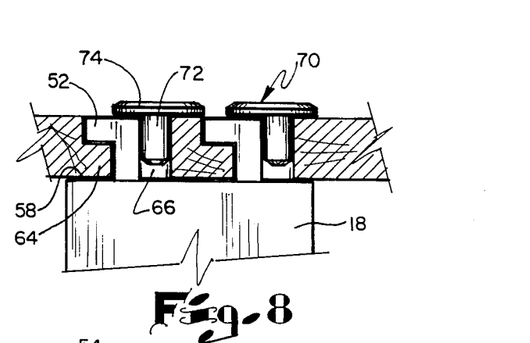
FIG. 8 is a view substantially similar to that of FIG. 7 except that pegs have been inserted in position within the keyways.

Referring particularly to FIGS. 6–8, the key bolts 46 are engaged within the keyways 48 by inserting the key bolt 46 fully within the central aperture 54 of the keyway 48. Once the upper surface 58 of the leg 18 abuts the lower surface 60 of the table top 12, the leg 18 is then slidingly moved along the bottom surface 60 in the direction indicated by the arrow 62 so as to engage the tabs 52 within the shelf portions 56. This action snugly engages key bolts 46 within the keyways 48 by sandwiching the ledges 64 between the tab members 52 and the upper surface 58 of the leg 18.

In one embodiment of the present invention, the keyways 48 pass entirely through the table top 12. This particular embodiment is illustrated in FIGS. 6–8 as well as FIGS. 1, 2 and 4. In this particular embodiment, once the key bolts 46 have been fully engaged within the keyways 48, the openings 66 remain exposed at the upper surface 68 of the table top 12. These openings 66 are the residual portions of the central apertures 54 of the keyways 48. In preferred form, a plurality of plug members 70 are provided which include a central shaft 72 and a cap portion 74. The central shaft 72 is sized and shaped so as to snugly fit within the opening 66, and the cap portion 74 is sized and shaped so as to cover all or a majority of the keyways 48. In this manner, the plugs 70 are inserted into the apertures 66 so as to further stabilize and firmly maintain the key bolts 46 within the keyways 48. Moreover, the plugs 70 prevent dirt and other material from inadvertently accumulating within the apertures 66.

Figure 9:
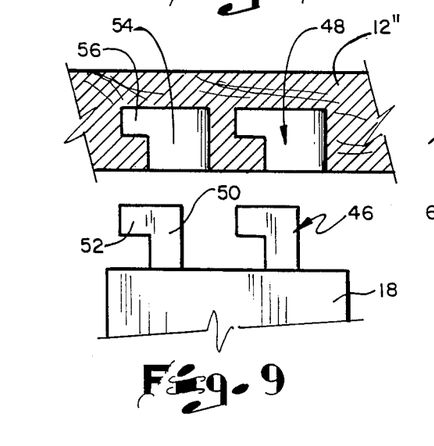
FIG. 9 is a perspective view, with some parts in section, similar to that of FIG. 6 except that the keyways disposed within the table top member are recessed therein from beneath the table top member.
Figure 10:
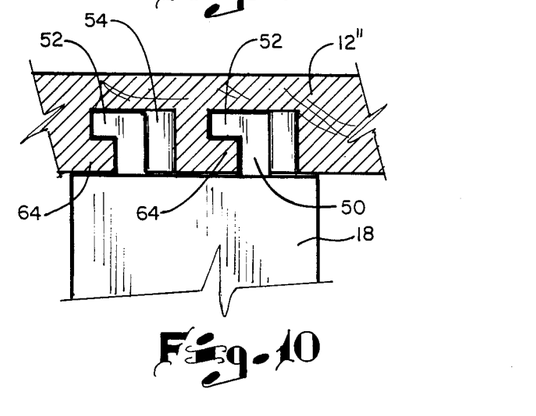
FIG. 10 is a view substantially similar to that of FIG. 9 except that the key bolts have been fully engaged within the keyways of the table top member.
Figure 11:
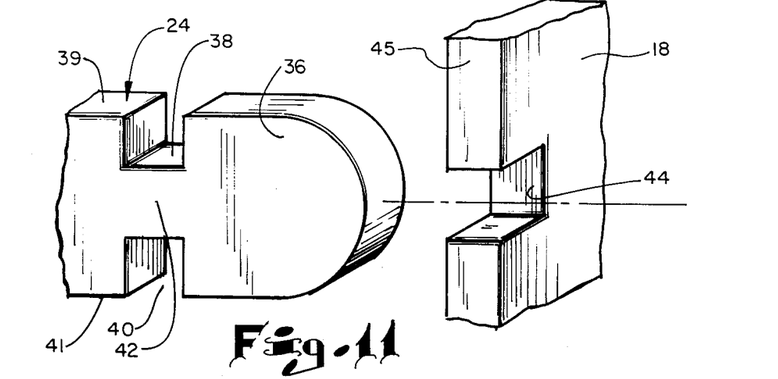
FIG. 11 is an enlarged, perspective view, with some parts in section, of one end of a support rail positioned adjacent a leg member having the notched portion therein.
Figure 12:
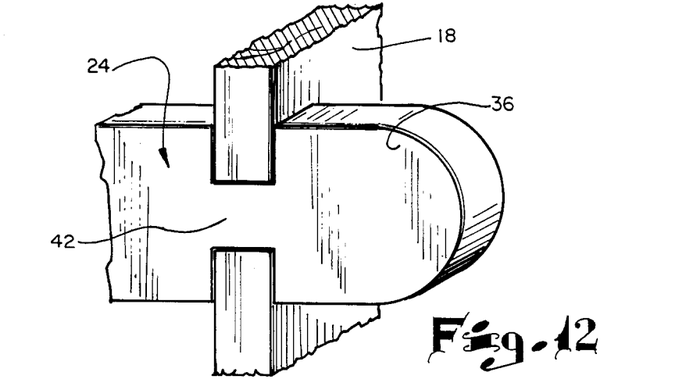
FIG. 12 is a view substantially similar to that of FIG. 11 except illustrating the engagement of the support rail with the notched portion of the leg member.
Figure 13:
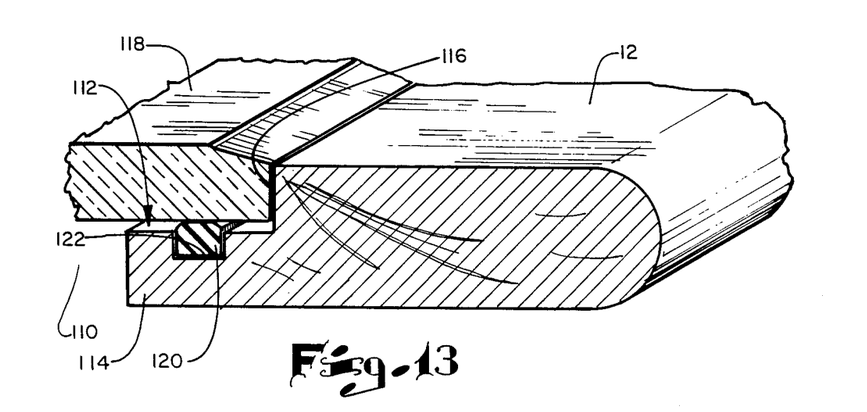
FIG. 13 is an enlarged, sectional view illustrating one embodiment of the inner ledge support member of the interior opening in the table top member with an inlay component positioned thereon.

An alternate embodiment of the present invention is illustrated in FIGS. 9 and 10 wherein the keyways 48 are recessed within the table top 12''. In this particular embodiment, the key bolts 46 and the keyways 48 are sized and shaped as previously described except for the recessed aspect of the keyways 48. The key bolts 46 are inserted within the keyways 48, and the leg 18 is slidingly moved relative to the table top 12'' so as to engage the tabs 52 within the shelf portions 56. However, since the keyways 48 do not extend entirely through the table top 12'', there is no necessity for the plug member 70 as in the previous embodiment. In this particular embodiment, it is important that the tab members 52 be sized and shaped so as to firmly and snugly fit within the shelf portions 56 so as to snugly sandwich the ledge 64 between the tabs 52 and the upper surface 58 of the leg 18 to maintain the leg 18 securely attached to the table top 12''.

Figure 3:
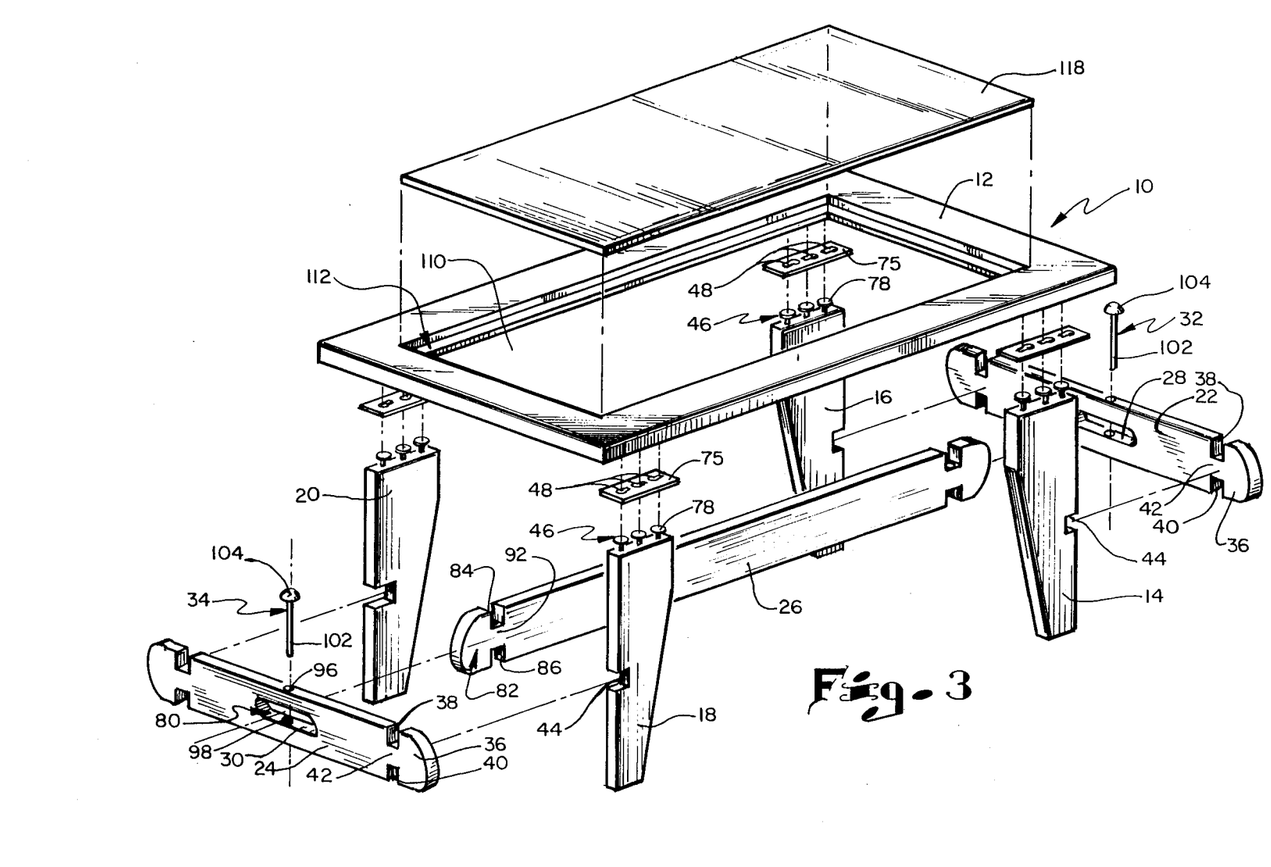
FIG. 3 is an enlarged, exploded perspective view of a second modular table assembly embodiment constructed in accordance with the present invention.
Figure 14:
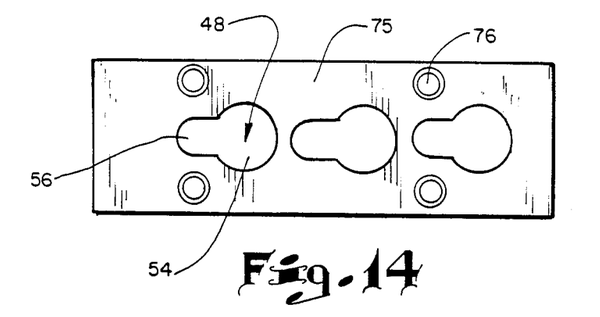
FIG. 14 is a plan view of another keyway embodiment of the present invention.
Figure 15:
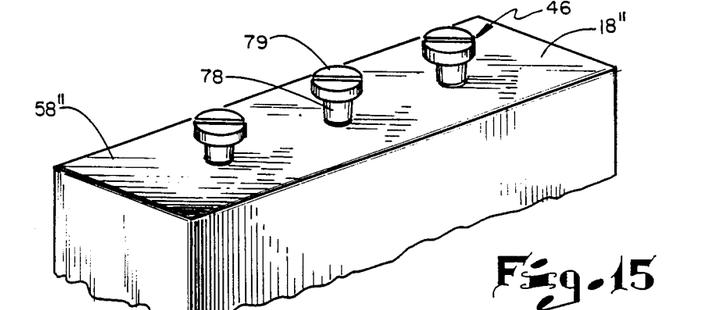
FIG. 15 is a partial perspective view of the top portion of a leg incorporating an embodiment of the key bolt assembly of the invention to be used with the embodiment illustrated in FIG. 14.

Yet another embodiment of the invention is illustrated in FIGS. 3, 14 and 15. This embodiment represents a less expensive construction of the present invention. In this embodiment, the keyways 48 are not formed in the table top 12 but rather are formed in a separate plate member 75. The plate 75 includes a plurality of apertures 76 disposed therein and through which bolts or other appropriate connecting members (not illustrated) may pass in order to secure the plate 75 to the bottom surface of the table top 12. Bolts 78 are secured in the upper surface 58" of the leg 18" so that the heads 79 of the bolts 78 project from above the surface 58". The head members 79 and the shaft portions immediately therebelow which project above the surface 58" form the key bolts 46. These are in turn inserted into the keyways 48 in the plate 75 in a manner similar to the previous embodiments of the invention. The plate 75 is sandwiched between the head 79 (acting as a tab 52) and the upper surface 58 of the leg 18" after the bolts 78 have been inserted and slidingly engaged within the keyways 48. It should be noted that sufficient space between the plate 75 and the table top 12 should be maintained to permit the heads 79 to be sandwiched between the plate 75 and the top 12 as the bolts 78 are slidingly moved into the shelf portion 56 of the keyways 48. This spacing can be readily adjusted by appropriately adjusting the connecting members which attach the plate 75 to the table top 12.

As previously discussed, a key feature of the present invention is the cross member 26 which interconnects the oppositely disposed stabilizing rails 22, 24 or the like. Referring more particularly to FIGS. 1–3 and 16 and using the stabilizing rail 24 by way of example, each stabilizing rail 24 includes an apertured portion 80 for receiving and engaging an end portion 82 of the cross member 26. More specifically, each end portion 82 includes a pair of opposed notches 84, 86 disposed in the respective side edges 88, 90 of the cross member 26. The notches 84, 86 define a narrowed neck portion 92 similar to the arrangement illustrated in FIG. 11 and also define an end piece 92. A cylindrical bore 94 passes through the neck portion 92 and interconnects the notches 84, 86. In the preferred and illustrated embodiment, the cross member 26 is rectangular in cross-section which has a width dimension A and a length dimension B.

Figure 2:
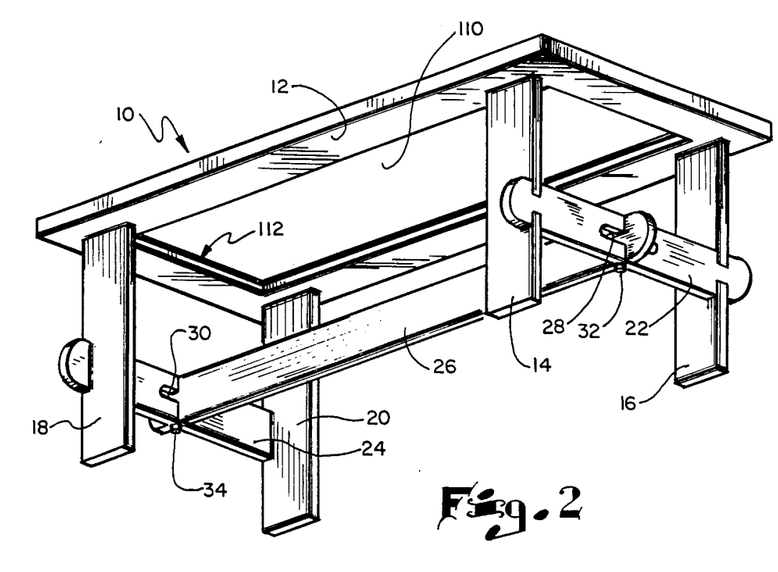
FIG. 2 is a bottom perspective view of the table assembly of FIG. 1.

The apertured portion 80 of the rail 24 is preferably centrally disposed along the length of the rail 24 and includes the longitudinal slot 30. The slot 30 is preferably axially aligned parallel with the longitudinal axis of the rail 24. The length of the slot 30 is slightly greater than the length B of the cross member 26, and the height of the slot 30 is at least slightly greater than the width A of the member 26. In this manner, the cross member 26 may be rotated so as to pass the end piece 93 through the slot 30. Once the neck portion 82 is aligned within the slot 30, the cross member 26 is again rotated 90° to interlock the cross member 26 with the rail 24 as seen in FIGS. 1 and 2.

Figure 16:
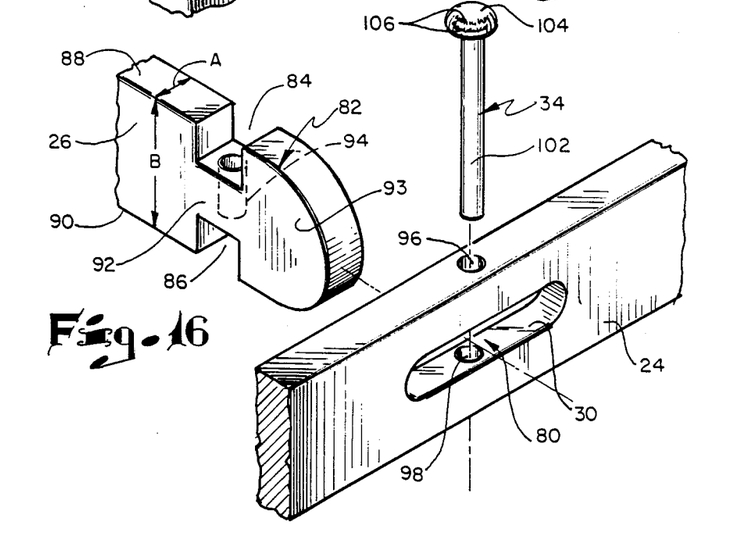
FIG. 16 is an enlarged, perspective view with some parts in section, of one end of a cross member positioned adjacent the apertured portion of a stabilizing rail prior to the interconnection thereof.

The rail 24 also includes two axially aligned bores 96 and 98 passing through the width of the rail 24 at the approximate center of the slot 30. The bores 96 and 98 are orthogonal to the longitudinal axis of the rail 24 and are positioned so as to align with the bore 94 in the neck portion 92 after the cross-member 26 has been interlocked with the rail 24. A pin member 34 having an elongate shaft 102 and a head portion 104 is then inserted through the aligned bores 92, 96, 98 so as to firmly hold the cross member 26 in position within the slot 30. In preferred form, a logo 106 may be placed on the head 104 of each pin member 34 so as to identify the manufacturer of the table assembly 10.

Referring now to FIGS. 1–3 and 13, the table top member 12 preferably includes an interior opening 110. While the preferred form of the invention includes a single, central opening 110, it is envisioned that the present invention may include a plurality of smaller interior openings disposed in the table top 12 in any desired design. A ledge support member 112 is disposed along the interior perimeter of the opening 110. While the ledge support member 112 may take the form of a plurality of relatively small support wedges or the like (not illustrated) intermittently disposed along the interior perimeter of the opening 110, the preferred and illustrated form includes a continuous ledge 114 extending along the entire perimeter of the opening 110. The ledge 114 defines a shoulder 116, and together the ledge 114 and shoulder 116 are adapted to receive any desired inlay component 118 for support over the central opening 110. Examples of such inlay components include glass, plastic, marble, wood designs of a construction or color different from that of the table top 12, and the like. The inlay component 118 conforms to the shape of the top 12 and is preferably sized and shaped so as to be readily received on the ledge 114 and abut the shoulder 116. In this way, the design and appearance of the table top 12 can be changed as desired without having to change the entire table top 12 or purchase another table. In one embodiment of the invention, a resilient insert 120 is disposed within a groove 122 along the length of the ledge 114. The resilient insert 120 may be utilized in order to soften the contact of the inlay component 118 with the ledge 114, particularly when the inlay component 118 is heavy and/or fragile as in the case of glass or the like. It is apparent from the drawings, and particularly from FIG. 3, that in the assembled position, the cross member 26 must limit the spacing between the stabilizing rails 22 and 24 to hold those rails in engagement in the notched portions 44 in the legs 14–20.

As can be seen from the above, the present invention provides a modular table assembly which is easily and readily assembled into a permanent-like structure due to the stability afforded by the interrelationship of the components thereof. The key bolt/keyway arrangement of the legs and table top member in conjunction with the keying interengagement between the stabilizing rails, the legs, and particularly the cross member all afford a uniquely stable and secure table assembly. Moreover, the modular table assembly of the present invention permits ready change of the design appearance of the table top portion thereof without having to disassemble or exchange basic components of the table assembly. This is achieved by merely replacing the inlay component or components within the table top portion of the table assembly. The particular combination of the various components of the present invention, therefore, provide a permanent-like yet portable modular table assembly having unusual stability characteristics and unique design appearance capabilities. Moreover, the features of this invention can be applied to a variety of different types of table assemblies such as coffee tables, end tables, and the like, as well as other furniture items such as chests, credenzas, and the like. Furthermore, because of the ease of assembly and disassembly it is apparent that a table may be easily modified in height by substituting legs of a different length.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein but may be modified within the scope of the appended claims.

I claim:

1. A modular furniture assembly having quickly attachable and detachable parts comprising:
   a top member having an upper surface and a plurality of keyways;
   a plurality of legs to support said top member, each said leg including at least one key bolt member sized and shaped for sliding engagement within one said keyway to attach said leg to said top member;
   stabilizing rails disposed opposite each other and interconnecting paired members of said legs to provide support and stability to said legs, said rails being keyed to interlock with notched portions disposed in said legs; and
   a cross member interconnecting said oppositely disposed stabilizing rails to provide fixed support for said legs, the end portions of said cross member being keyed to interlock with said stabilizing rails;
   each said stabilizing rail including an apertured portion for receiving and engaging the associated cross member end portion, said apertured portion including an elongated through slot centrally disposed in said stabilizing rail, each said cross member end portion extending through said elongated slot of the associated stabilizing rail and each said cross member end portion including a narrowed neck for firm interlocking engagement within said slot;
   wherein each said key bolt comprises a shaft portion and a key tab projecting radially outwardly from the end of said shaft portion, and wherein each said keyway comprises a central opening extending vertically upwardly into said top member and sized for receiving said key bolt and a shelf portion extending radially outwardly from the upper end of said opening sized and shaped to receive said key tb, each said key bolt being attached at an upper end surface of an associated leg member, said key bolt and said keyway being sized and shaped so that said top member is firmly sandwiched between said key tab and the upper end surface of said leg when said key bolt is fully engaged within said keyway.

2. The furniture assembly as claimed in claim 1, wherein each said keyway passes entirely through said top member with said shelf portion being disposed along said upper surface of said top member and wherein said furniture assembly further includes a plurality of peg means, each adapted for insertion into one said keyway opening to further tighten and stabilize said key bolt within said keyway.

3. The furniture assembly as claimed in claim 2, wherein each said peg means includes a top portion substantially covering said keyway when inserted into said keyway opening.

4. A portable modular table assembly having quickly attachable and detachable parts comprising:
   a table top having an upper surface and a plurality of paired keyways and a central opening with a ledge support portion disposed about the interior perimeter of said central opening;
   a plurality of elongated legs for supporting said table top, each said leg having at least one key bolt member axially projecting from the top end thereof and sized and shaped for sliding engagement within one said keyway to fasten said key bolt within said keyway;
   oppositely disposed stabilizing rails interconnecting paired members of said legs below said table top to provide support and stability thereto, said rails being keyed to interlock with notched portions disposed in said legs; and
   a cross member interconnecting said oppositely disposed stabilizing rails to provide fixed support for said legs, the end portions of said cross members being keyed to interlock within apertured portions of said stabilizing rails, each said apertured portion of each stabilizing rail including an elongated through slot centrally disposed on said stabilizing rail and aligned substantially parallel to the longitudinal dimension of said rail for receiving and engaging the associated cross member end portion, each said cross member end portion extending through said elongated slot of the associated stabilizing rail, each cross member end portion including a narrowed neck dimensioned for firm interlocking engagement within said slot by rotation of said cross member after insertion of said cross member end portions into said slots;
   wherein each said keyway includes a central aperture and an adjacent shelf portion, and wherein each said key bolt includes a shaft and a tab projecting radially outwardly from the end of said shaft and adapted for engagement within said shelf.

5. The table assembly as claimed in claim 4, wherein each said keyway is recessed within said table top to prevent visibility of said keyway from said upper surface of said table top.

6. The table assembly as claimed in claim 4, wherein each said keyway passes entirely through said table top, said shelf portion of each keyway being disposed along said upper surface of said table top.

* * * * *